US012673451B2

(12) United States Patent
Saito

(10) Patent No.: US 12,673,451 B2
(45) Date of Patent: Jul. 7, 2026

(54) RESIN-SEALING METHOD

(71) Applicant: Yamaha Robotics Co., Ltd., Tokyo (JP)

(72) Inventor: Takashi Saito, Nagano (JP)

(73) Assignee: Yamaha Robotics Co., Ltd., Tokyo (JP)

( * ) Notice: Subject to any disclaimer, the term of this patent is extended or adjusted under 35 U.S.C. 154(b) by 0 days.

(21) Appl. No.: 17/985,906

(22) Filed: Nov. 14, 2022

(65) Prior Publication Data

US 2023/0073604 A1    Mar. 9, 2023

Related U.S. Application Data

(62) Division of application No. 17/489,810, filed on Sep. 30, 2021, now Pat. No. 12,409,586.

(30) Foreign Application Priority Data

Nov. 25, 2020    (JP) ................................. 2020-194894

(51) Int. Cl.
    *B29C 43/34*        (2006.01)
    *B29C 43/18*        (2006.01)
                (Continued)
(52) U.S. Cl.
    CPC .............. *B29C 43/34* (2013.01); *B29C 43/18* (2013.01); *B29C 43/58* (2013.01);
                (Continued)
(58) Field of Classification Search
    CPC ......... B29C 43/34; B29C 43/18; B29C 43/58; B29C 2043/3466; B29C 2043/5875;
                (Continued)

(56) References Cited

U.S. PATENT DOCUMENTS 5,425,834 A  *  6/1995  Shinohara ............... B29C 70/54
                                        156/360
2001/0007780 A1*  7/2001  Minamio .............. H01L 21/565
                                        438/106
                (Continued)

FOREIGN PATENT DOCUMENTS

CN        105034228      * 12/2018      ............. B29C 43/20
JP        2003231145        8/2003
                (Continued)

OTHER PUBLICATIONS

"Office Action of Taiwan Counterpart Application", issued on Nov. 24, 2022, with partial English translation thereof, pp. 1-38.
                (Continued)

*Primary Examiner* — Alison L Hindenlang
*Assistant Examiner* — Shibin Liang
(74) *Attorney, Agent, or Firm* — JCIPRNET

(57) ABSTRACT

There is provided a resin-sealing apparatus that supplies an appropriate amount of sheet-shaped resin for each workpiece, thereby improving the molding quality of a molded product without production of resin dust, such that no redundant resin is produced on a molded product. The resin-sealing apparatus includes a resin supply part that supplies a sheet-shaped resin by cutting out an amount of sheet-shaped resin appropriate for one-time compression molding from a long resin sheet formed to have a predetermined width and a predetermined thickness depending on an amount of resin required for each workpiece, and a transport part that transports the appropriate amount of sheet-shaped resin supplied by the resin supply part to a sealing mold.

12 Claims, 10 Drawing Sheets

(51) Int. Cl.
  *B29C 43/58* (2006.01)
  *B29L 31/34* (2006.01)
(52) U.S. Cl.
  CPC ................. *B29C 2043/3466* (2013.01); *B29C 2043/5875* (2013.01); *B29L 2031/34* (2013.01)
(58) Field of Classification Search
  CPC ..... B29C 43/32; B29C 43/20; B29L 2031/34; H01L 21/44
  See application file for complete search history.

(56) References Cited

U.S. PATENT DOCUMENTS

| | | | |
|---|---|---|---|
| 2006/0093692 A1* | 5/2006 | Miyajima | B29C 43/58 |
| | | | 425/141 |
| 2016/0284576 A1* | 9/2016 | Onishi | H01L 21/67126 |
| 2021/0245451 A1* | 8/2021 | Boroughs | B29C 70/388 |

FOREIGN PATENT DOCUMENTS

| | | |
|---|---|---|
| JP | 2006175638 | 7/2006 |
| JP | 2015056467 | 3/2015 |
| JP | 2017034286 | 2/2017 |
| JP | 2019186395 | 10/2019 |
| TW | I472065 | 2/2015 |
| TW | I597164 | 9/2017 |
| TW | 201821236 | 6/2018 |

OTHER PUBLICATIONS

"Office Action of China Counterpart Application", issued on Dec. 19, 2024, with English translation thereof, p. 1-p. 17.

* cited by examiner

R

R 20a,20b
(2a,2b)

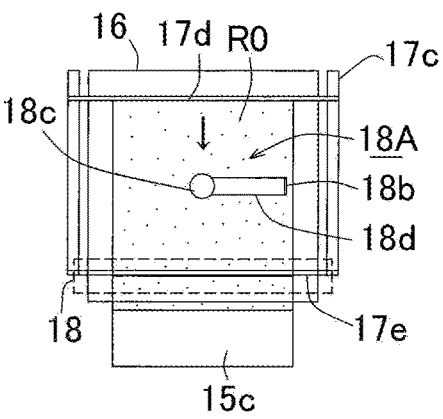
FIG. 10(c)
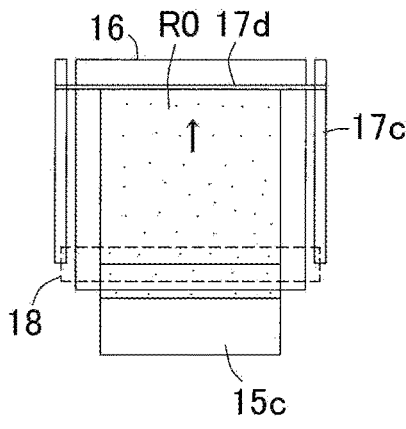
FIG. 10(b)
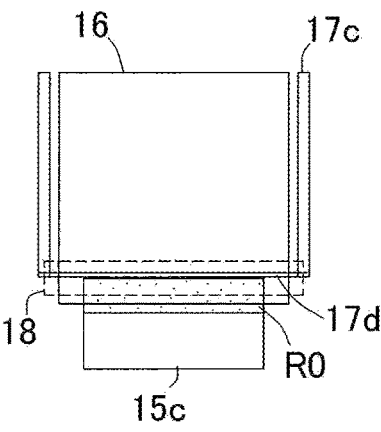
FIG. 10(a)
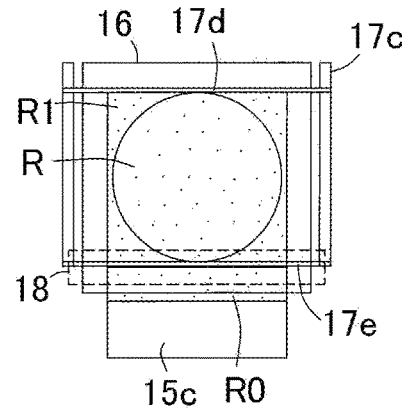
FIG. 10(f)
FIG. 10(e)
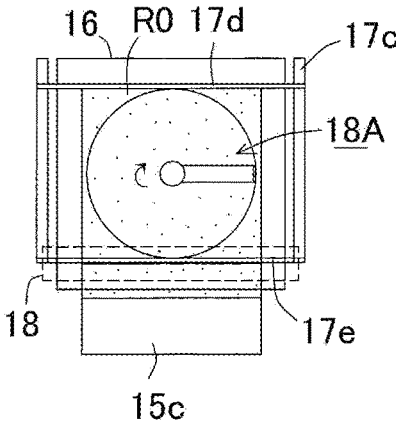
FIG. 10(d)

RESIN-SEALING METHOD

CROSS-REFERENCE TO RELATED APPLICATION

This application is a divisional application of and claims the priority benefit of a prior application Ser. No. 17/489,810, filed on Sep. 30, 2021. The prior application Ser. No. 17/489,810 claims the priority benefit of Japan application serial no. 2020-194894, filed on Nov. 25, 2020. The entirety of each of the above-mentioned patent application is hereby incorporated by reference herein and made a part of this specification.

BACKGROUND

Technical Field

The disclosure relates to a resin-sealing method by which a workpiece having an electronic component mounted on a plate-shaped member and an appropriate amount of sheet-shaped resin for each workpiece are supplied and compression-molded.

Related Art

Methods for using a thermosetting resin to resin-seal a workpiece on which a semiconductor chip, an electronic component, or the like is mounted are broadly classified into two molding methods of transfer molding and compression molding. The transfer molding is performed by mainly filling a cavity with a resin obtained by heating and melting a minitablet (solid resin) via a runner and a gate. In addition, in the compression molding, a liquid resin, a granular resin, or a sheet-shaped resin is used and, currently, the liquid resin or the granular resin is often used in terms of costs and handling (see Patent literatures 1 (Japanese Patent Laid-open No. 2015-208967) and Patent literatures 2 (Japanese Patent Laid-open No. 2010-179507)). Incidentally, a sheet resin or a powder resin to be used in compression molding is in a developing stage and is not mass-produced in the resin-sealing field of a semiconductor apparatus.

In recent years, a package part (resin-sealing part) decreased in thickness. In particular, when a workpiece having a semiconductor chip wired thereto is sealed with a resin, a lower-mold cavity movable type of compression molding which almost does not involve the flow of resin is widely performed, compared to an upper-mold cavity movable type of compression molding. In addition, even in the lower-mold cavity movable type of compression molding, there is a growing demand for compression molding using an appropriate amount of resin with 100% of resin usage and without redundant resin. This is because some workpieces have a location at which a semiconductor chip is not mounted on a substrate, there is a difference in mounting amount of the semiconductor chip for each workpiece, and thus it is necessary to increase or decrease a supply amount of resin each time of supply such that an appropriate amount of resin is supplied. In order to perform the molding with the appropriate amount of resin, there is also a molding method in which redundant resin is estimated in advance and the redundant resin is led to overflow to an overflow cavity; however, when the resin is discharged over the substrate, a problem arises in that a longitudinal resin burr may be formed on a side surface of the substrate. In addition, an overflow cavity is arranged on a substrate in some cases; however, a redundant-resin region needs to be arranged on the substrate, and thus the cost of the substrate is increased.

The resin used for compression molding may be a powder resin, a granular resin, a liquid resin, or the like. However, the powder resin is difficult to handle due to floating of dust. The liquid resin is difficult to be supplied to a mold in a constant time due to high viscosity thereof, and thus molding variances are likely to occur. The granular resin is easy to supply by an appropriate amount with no waste and no disposal costs of unnecessary resin. However, granules of the granular resin do not have a uniform outer diameter and have some unevenness, and thus adjustment of a fine amount to obtain an appropriate amount is difficult to perform. In addition, since there are large and small granules, the granular resin is likely to be unevenly sprinkled. Hence, when the granules are dropped from a trough, there is a concern that the granules will be caught on each other due to a difference in grain size or will bounce after being dropped, and thus the granular resin is difficult to thinly and evenly sprinkle.

In addition, when a package (resin-sealing part) decreases in thickness, and the amount of resin which is supplied to a cavity is reduced, the resin granules need to be sparsely sprinkled with a gap therebetween if the granular resin has a large grain size, and thus the resin is difficult to evenly sprinkle. In addition, when the granular resin is supplied, the granular resin is dropped and sprinkled from a trough corresponding to a cavity shape, while a parts feeder applies vibration to the resin to separate the resin. Hence, the granular resins are rubbed against each other, and dust is likely to float. In addition, even when an air suctioning device or an ionizer is arranged, fine dust cannot be completely removed. There is a concern that attachment, accumulation, and solidification of the dust on a component will result in malfunction, and attachment of the dust on a substrate will result in a dent in a sealing mold.

The disclosure is made with consideration for such circumstances, and to provide a resin-sealing apparatus and a resin-sealing method that supply an appropriate amount of sheet-shaped resin for each workpiece, thereby improving the molding quality of a molded product without production of resin dust, such that no redundant resin is produced on a molded product.

SUMMARY

According to the disclosure, there is provided a resin-sealing method for carrying a sheet-shaped resin and a workpiece having an electronic component mounted on a plate-shaped member into a sealing mold, and performing compression molding, the resin-sealing method including: a step of acquiring workpiece information on a mounting ratio of the electronic component mounted on the plate-shaped member or a total volume of the electronic component for each workpiece which is supplied from a workpiece supply part; a step of calculating an amount of resin required for each workpiece from the workpiece information; a resin supplying step of supplying the sheet-shaped resin by cutting out an appropriate amount of sheet-shaped resin into a predetermined shape corresponding to a shape of the workpiece without redundancy or deficiency for one-time compression molding from a long resin sheet formed to have a predetermined thickness, the long resin sheet being unwound by a resin supply part; and a step of carrying the workpiece and the appropriate amount of sheet-shaped resin into the sealing mold and clamping and compression-molding the workpiece and the sheet-shaped resin.

According to the disclosure, there is provided another resin-sealing method for carrying a sheet-shaped resin and a workpiece having an electronic component mounted on a plate-shaped member into a sealing mold, and performing compression molding, the resin-sealing method including: a step of acquiring workpiece information on a mounting ratio of the electronic component mounted on the plate-shaped member or a volume of the electronic component for each workpiece which is supplied from a workpiece supply part; a step of calculating an amount of resin required for each workpiece from the workpiece information; a resin supplying step of supplying the sheet-shaped resin by cutting out an appropriate amount of sheet-shaped resin by a predetermined length for one-time compression molding for each workpiece from a long resin sheet formed to have a predetermined width and a predetermined thickness, the long resin sheet being unwound by a resin supply part; and a step of carrying the workpiece and the appropriate amount of sheet-shaped resin into the sealing mold and clamping and compression-molding the workpiece and the sheet-shaped resin.

According to the disclosure, there is provided still another resin-sealing method for carrying a sheet-shaped resin and a workpiece having an electronic component mounted on a circular-plate-shaped member into a sealing mold, and performing compression molding, the resin-sealing method including: a step of acquiring workpiece information on a mounting ratio of the electronic component mounted on the circular-plate-shaped member or a total volume of the electronic component for each workpiece which is supplied from a workpiece supply part; a step of calculating an amount of resin required for each workpiece from the workpiece information; a resin supplying step of supplying the sheet-shaped resin by cutting out an appropriate amount of sheet-shaped resin by a predetermined radius for one-time compression molding for each workpiece from a long resin sheet formed to have a predetermined thickness, the long resin sheet being unwound by a resin supply part; and a step of carrying the workpiece and the appropriate amount of sheet-shaped resin into the sealing mold and clamping and compression-molding the workpiece and the sheet-shaped resin.

BRIEF DESCRIPTION OF THE DRAWINGS

FIGS. 10(a) to 10(f) are step views illustrating a step of supplying the sheet-shaped resin.

DESCRIPTION OF THE EMBODIMENTS

Figure 1:
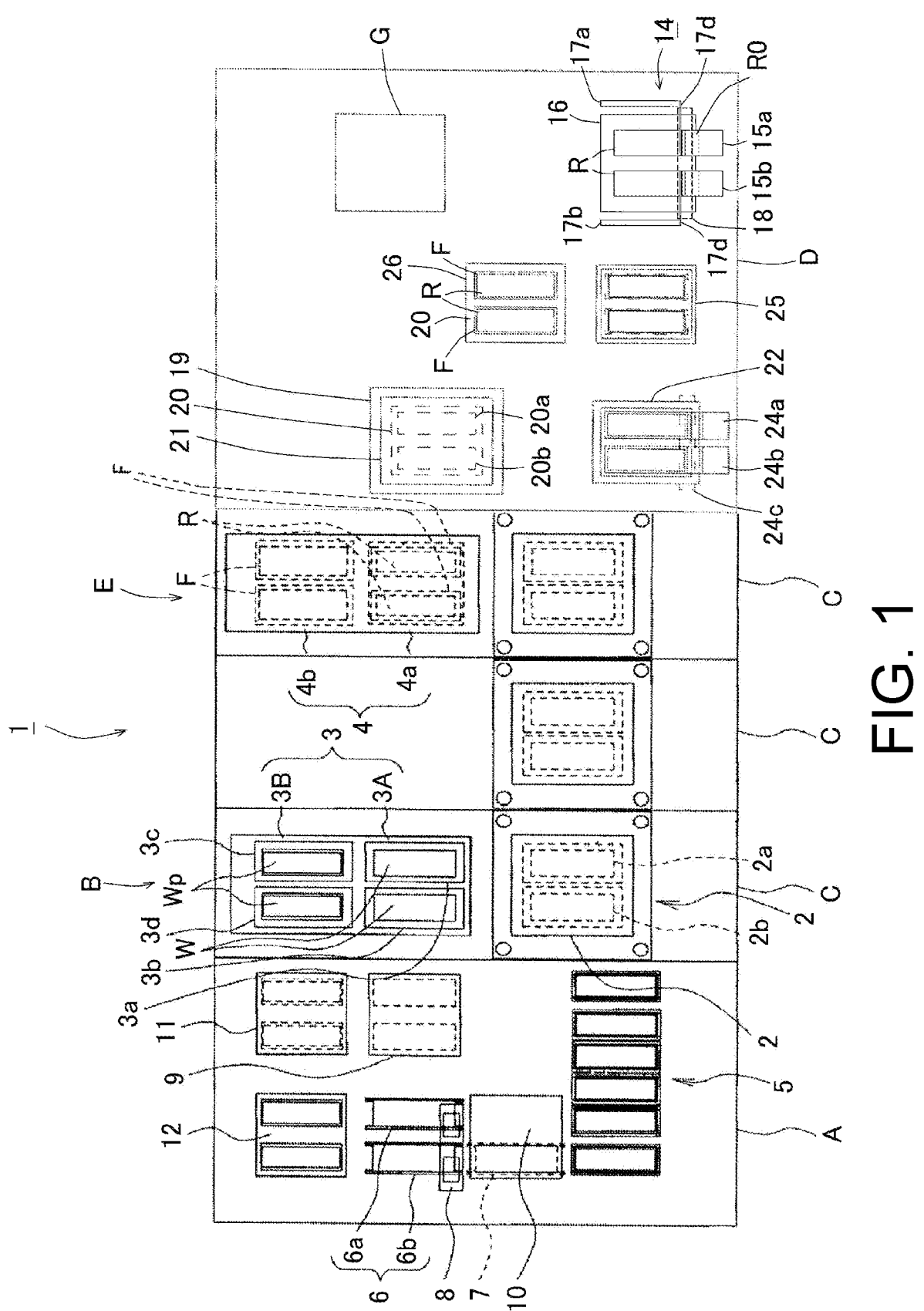
FIG. 1 is a layout configuration view illustrating an example of a lower-mold cavity movable compression-molding apparatus.

According to the disclosure, there is provided a resin-sealing method for carrying a sheet-shaped resin and a workpiece having an electronic component mounted on a plate-shaped member into a sealing mold, and performing compression molding, the resin-sealing method including: a step of acquiring workpiece information on a mounting ratio of the electronic component mounted on the plate-shaped member or a total volume of the electronic component for each workpiece which is supplied from a workpiece supply part; a step of calculating an amount of resin required for each workpiece from the workpiece information; a resin supplying step of supplying the sheet-shaped resin by cutting out an appropriate amount of sheet-shaped resin into a predetermined shape corresponding to a shape of the workpiece without redundancy or deficiency for one-time compression molding from a long resin sheet formed to have a predetermined thickness, the long resin sheet being unwound by a resin supply part; and a step of carrying the workpiece and the appropriate amount of sheet-shaped resin into the sealing mold and clamping and compression-molding the workpiece and the sheet-shaped resin. In this manner, an amount of resin required for each workpiece having the electronic component mounted on the plate-shaped member can be calculated to supply the sheet-shaped resin by cutting out the appropriate amount of sheet-shaped resin into the predetermined shape corresponding to the shape (rectangle, circle, irregular shape, or the like) of the workpiece without redundancy or deficiency for one-time compression molding from the long resin sheet formed to have the predetermined thickness. Hence, resin dust is not scattered during resin supply, and the appropriate amount of resin can be supplied for a workpiece having a different mounting amount of the electronic component, a workpiece including a plate-shaped member having a different shape, or the like.

According to the disclosure, there is provided another resin-sealing method for carrying a sheet-shaped resin and a workpiece having an electronic component mounted on a plate-shaped member into a sealing mold, and performing compression molding, the resin-sealing method including: a step of acquiring workpiece information on a mounting ratio of the electronic component mounted on the plate-shaped member or a volume of the electronic component for each workpiece which is supplied from a workpiece supply part; a step of calculating an amount of resin required for each workpiece from the workpiece information; a resin supplying step of supplying the sheet-shaped resin by cutting out an appropriate amount of sheet-shaped resin by a predetermined length for one-time compression molding for each workpiece from a long resin sheet formed to have a predetermined width and a predetermined thickness, the long resin sheet being unwound by a resin supply part; and a step of carrying the workpiece and the appropriate amount of sheet-shaped resin into the sealing mold and clamping and compression-molding the workpiece and the sheet-shaped resin.

According to the resin-sealing method, since the workpiece information on the mounting ratio of the electronic component or the volume of the electronic component is acquired for each workpiece which is supplied from the workpiece supply part, and the appropriate amount of sheet-shaped resin is cut out by the predetermined length for one-time compression molding for each workpiece having the electronic component mounted on the plate-shaped member, the appropriate amount of resin without the redundancy or deficiency can be supplied to the sealing mold for each workpiece and the compression molding of the workpiece can be performed. Hence, since resin dust is not scattered during resin supply, and further the appropriate amount of resin can be supplied to perform resin-sealing for each workpiece, the molding quality of a molded product is improved, and the molded product does not have unnecessary resin.

According to the disclosure, there is provided still another resin-sealing method for carrying a sheet-shaped resin and a workpiece having an electronic component mounted on a circular-plate-shaped member into a sealing mold, and performing compression molding, the resin-sealing method including: a step of acquiring workpiece information on a mounting ratio of the electronic component mounted on the circular-plate-shaped member or a total volume of the electronic component for each workpiece which is supplied from a workpiece supply part; a step of calculating an amount of resin required for each workpiece from the workpiece information; a resin supplying step of supplying the sheet-shaped resin by cutting out an appropriate amount of sheet-shaped resin by a predetermined radius for one-time compression molding for each workpiece from a long resin sheet formed to have a predetermined thickness, the long resin sheet being unwound by a resin supply part; and a step of carrying the workpiece and the appropriate amount of sheet-shaped resin into the sealing mold and clamping and compression-molding the workpiece and the sheet-shaped resin.

According to the resin-sealing method, since the workpiece information on the mounting ratio of the electronic component or the volume of the electronic component is acquired for each workpiece which is supplied from the workpiece supply part, and the appropriate amount of sheet-shaped resin is cut out by the predetermined radius for one-time compression molding for each workpiece having the electronic component mounted on the circular-plate-shaped member, the appropriate amount of resin can be supplied to the sealing mold for each workpiece and the compression molding of the workpiece can be performed. Hence, since resin dust is not scattered during the resin supply, and further the appropriate amount of resin can be supplied without redundancy or deficiency to perform resin-sealing for each workpiece, the molding quality of a molded product is improved, and the molded product does not have unnecessary resin.

When the amount of resin is deficient according to the mounting ratio of the electronic component mounted on the plate-shaped member, an appropriate amount of sheet-shaped resin obtained by adding the deficient amount of resin may be cut out. A required resin volume may be calculated by subtracting the total volume of the electronic component mounted on the plate-shaped member or the circular-plate-shaped member from a volume of an empty cavity of the sealing mold such that the appropriate amount of sheet-shaped resin may be cut out.

Consequently, the appropriate amount of sheet-shaped resin can be cut out without redundancy or deficiency for one-time compression molding for each workpiece having a different mounting amount of the electronic component.

In addition, the resin-sealing method may further include a computing step of computing the appropriate amount of sheet-shaped resin. Consequently, the sheet-shaped resin cut out by the resin supply part can be computed and fed back, and thereby the sheet-shaped resin can be supplied with high accuracy.

According to the disclosure, it is possible to provide the resin-sealing apparatuses and the resin-sealing methods that supply an appropriate amount of sheet-shaped resin for each workpiece, thereby improving the quality of a molded product without production of resin dust, such that a molded product does not have unnecessary resin.

(Overall Configuration)

Hereinafter, embodiments of the disclosure will be described with reference to the drawings. A layout configuration of a resin-sealing apparatus according to an embodiment of the disclosure is to be described with reference to FIG. 1. The resin-sealing apparatus is described on the basis of a lower-mold cavity movable compression-molding apparatus 1, and a workpiece W is described on the basis of a workpiece having electronic components Wt mounted in a matrix shape on a plate-shaped member Wb. In addition, the same reference signs may be assigned to members having the same function in all of the drawings for describing the embodiments, and thus the repeated description thereof may be omitted.

In the compression-molding apparatus 1, a workpiece transport part B performs carrying-in and carrying-out of the workpiece W supplied from a workpiece processing unit A (including a workpiece supply part and a workpiece storing unit) to a sealing mold 2 of a press unit C, and a resin transport part E carries an appropriate amount of sheet-shaped resin R together with a film F from a resin supply unit D (resin supply part) into the sealing mold 2. The press unit C clamps the workpiece W and the appropriate amount of sheet-shaped resin R carried into the lower-mold cavity movable sealing mold 2 (compression-molding mold) and performs compression molding thereon. The workpiece processing unit A mainly performs supply of the workpiece W and storage of a molded product Wp after resin sealing. The press unit C mainly performs a process of compression molding of the workpiece W into the molded product Wp. The resin supply unit D mainly performs supply of the film F and the appropriate amount of sheet-shaped resin R and disposal of the used film F to a film disposer G after the resin sealing.

First, the workpiece W to be molded includes a plurality of electronic components Wt which are mounted in a matrix shape on the plate-shaped member Wb. More specifically, examples of the plate-shaped member not only include a resin substrate formed into a strip shape, a ceramics substrate, a metal substrate, but include a carrier plate, a lead frame, a semiconductor wafer and the like which are base members (hereinafter, collectively referred to as "plate-shaped member Wb"). In addition, examples of the electronic component Wt include a semiconductor chip, a MEMS chip, a passive element, a heat dissipating plate, a conductive member, a spacer, or the like. Besides, as will be described later, a variation example of the apparatus which is applicable particularly to the case of using a rectangular or circular plate-shaped member Wb is also considered. In addition, in the workpiece W, the plurality of electronic components Wt may be bonded to the plate-shaped member Wb using an adhesive tape having heat peelability on a carrier or a UV curable resin which is cured by UV irradiation, in addition to mounting of the electronic components by flip chip bonding, wire bonding, or the like.

On the other hand, examples of the sheet-shaped resin R include a film-shaped or sheet-shaped thermosetting resin (for example, filler-containing epoxy resin or silicone-based resin) which is molded to have a predetermined width and a predetermined thickness. The sheet-shaped resin R is cut out to have a predetermined size from a resin roll obtained in a manner that a long resin sheet R0 of which one surface or both surfaces are sandwiched by a protective film is wound into a roll shape. Incidentally, the sheet-shaped resin R may be a porous resin with a predetermined density or a resin having multiple through-holes with a predetermined density.

In addition, examples of the film (release film) F may include a film material having good heat resistance, peelability, flexibility, and extensibility such as polytetrafluoroethylene (PTFE), ethylene polytetrafluoroethylene (ETFE), PET, FEP, fluorine impregnated glass cloth, polypropylene, polyvinylidene chloride. An example of the film F can include a strip-shaped workpiece molding film having a size corresponding to the strip-shaped workpiece W.

Hereinafter, configurations of units of the compression-molding apparatus 1 illustrated in FIG. 1 will be briefly described.

Besides, in the embodiment, the compression-molding apparatus 1 is described, the compression-molding apparatus having two cavities 2a and 2b arranged in a lower mold of the sealing mold 2, collectively performing resin sealing on two workpieces W disposed therein, and obtaining two molded products Wp simultaneously.

As illustrated in FIG. 1, the workpiece processing unit A, the press unit C, and the resin supply unit D are juxtaposed with each other in series in this order. Besides, a random number of guide rails (not illustrated) straddling between the processing units are arranged in a straight line shape, and a workpiece loader 3 (workpiece transport part B) that transports the workpiece W or the like and a resin loader 4 (resin transport part E) that transports the film F, the sheet-shaped resin R, and the like are arranged to be movable between the processing units along a guide rail (not illustrated). Besides, the workpiece loader 3 performs not only a carrying-in operation of the workpiece W to the sealing mold 2 but also a carrying-out operation of the molded product Wp from the sealing mold 2, thus also functioning as an off-loader.

A configuration aspect of the compression-molding apparatus 1 can be changed by a modification of the configuration of each of the units. For example, the configuration illustrated in FIG. 1 is an example in which three press units C are arranged; however, the compression-molding apparatus can also be configured to have only one press unit C or two or four press units or more. In addition, other units can also be arranged. For example, a unit that supplies a resin such as a tablet resin or a liquid resin, other than the resin supply unit D, or a unit which supplies a member assembled with the workpiece W in the mold can also be arranged (not illustrated).

(Workpiece Processing Unit A)

The workpiece processing unit A includes a supply magazine 5 in which a plurality of workpieces W are stored and a storage magazine (not illustrated) in which a plurality of molded products Wp are stored, the supply magazine and the storage magazine being disposed to vertically overlap each other. The magazines are arranged to be lifted and lowered by an elevator mechanism. A known stack magazine, a slit magazine, or the like is used as the supply magazine 5 and the storage magazine (not illustrated). In the embodiment, the workpieces W and the molded products Wp are stored in both the supply magazine and the storage magazine, respectively, in a state where a mounting surface of the electronic component faces downward. Besides, regarding protection of the electronic component, the slit magazine that holds the workpiece W by inserting both ends of the workpiece into recessed portions which recede inward in a magazine frame may be used to separately hold the upper and lower workpieces W. In addition, the supply magazine 5 is held by the elevator mechanism (not illustrated) to be lifted and lowered, and thereby the workpiece W can be supplied from a predetermined location. Similarly, the storage magazine is held by the elevator mechanism (not illustrated) to be lifted and lowered, and thereby the molded product Wp can be stored at a predetermined location.

A supply rail 6, at which the workpieces W pushed out one by one from the supply magazine 5 are placed, is arranged in front (upper side in FIG. 1) of the supply magazine 5. In the embodiment, a relay rail 7 by which the workpiece W passes is arranged between the supply magazine 5 and the supply rail 6; however, the embodiment can be configured without the relay rail 7. Besides, a known pusher (not illustrated) or the like is used to move the workpiece W from the supply magazine 5 to the supply rail 6.

Here, the supply rail 6 supports a longitudinal side of the workpiece W from below by avoiding a mounting position of the electronic component and guides the workpiece W forward in a front-rear direction (up-down direction in FIG. 1). In addition, the supply rail 6 has a movement mechanism (not illustrated) which can move two workpieces W in a right-left direction by two rails (6a and 6b in FIG. 1), the workpieces W being placed side by side to have a transverse direction in the right-left direction. Consequently, after the workpiece W picked up from the supply magazine 5 is placed on one rail (for example, 6a), the supply magazines 6a and 6b are moved in a predetermined direction (for example, rightward direction) of the rightward or leftward direction, and the next workpiece W is to be placed on the other rail (for example, supply rail 6b).

In addition, a workpiece measuring unit 8 is arranged below the supply rail 6. The workpiece measuring unit 8 measures a thickness of the workpiece W from an under-surface side (mounting surface side of the electronic component) with respect to the workpiece W which moves on the supply rail 6 in the front-rear and right-left directions. Specifically, the workpiece measuring unit 8 includes two thickness sensors which measure thicknesses of the two workpieces W on the two supply rails 6a and 6b. A laser displacement meter or a camera (monocular camera or compound eye camera) is used as the thickness sensor, and the thickness of the workpiece W is measured based on output data from the meter or camera. Besides, "measurement of thickness" described here includes necessary measurement such as measurement of whether or not the electronic component Wt is mounted on the plate-shaped member Wb and a mounting height of the electronic component Wt, measurement of a mounting location shift of the electronic component, or measurement of the mounting number of electronic components Wt. For example, a total volume of the electronic component which is mounted on the workpiece W is calculated from a result of whether or not the electronic component Wt is mounted on the plate-shaped member Wb and a mounting height of the electronic component, based on results of the "measurement of thickness", and a supply amount of the sheet-shaped resin R is adjusted to the appropriate amount without redundancy or deficiency for one-time compression molding as will be described below, and thereby a molding thickness of a molded product can be controlled with high accuracy. The workpiece measuring unit 8 is fixed, and measurement is performed with movement of the workpiece W. However, measurement may be performed by causing the workpiece measuring unit 8 to perform frontward, rearward, rightward, and leftward scanning, while the workpiece W remains still. In addition, the embodiment may be configured to include one thickness sensor which measures the two workpieces W in order with predetermined scanning. Further, when data of a mounting amount of the electronic components of the workpiece W is separately input in the compression-molding apparatus via a control unit, the workpiece measuring unit 8 can be omitted.

Incidentally, the workpiece measuring unit 8 may be configured to not only measure the thickness of the workpiece W but also read identification information (for example, two-dimensional code) attached to the workpiece W. In addition, a code reader that can read the two-dimensional code of the workpiece W can also be arranged either over or below the relay rail 7. For example, codes of serial numbers or non-duplicated codes are attached as the identification information of the workpiece W, and thereby the workpieces W can be identified. The identification information is recorded in association with a detailed condition or the like of resin sealing, and thereby traceability can be enhanced.

The workpiece W placed on the supply rail 6 is held by a supply pickup 9 to be transported to a predetermined location. Besides, a known holding mechanism (for example, configuration in which a holding claw is arranged to pinch the workpiece, configuration in which a suction hole communicating with a suction device is arranged to suction the workpiece, or the like) (not illustrated) is used as a mechanism that holds the workpiece W. The supply pickup 9 is configured to be movable in the right-left and up-down directions. Consequently, the supply pickup holds the workpiece W placed on the supply rail 6 and performs a lifting operation and, thereby, can finally deliver the workpiece to the workpiece loader 3 to be described below. The supply pickup 9 is configured to include holding mechanisms side by side in the right-left direction at locations corresponding to the two workpieces W on the supply rails 6a and 6b. Consequently, the supply pickup can simultaneously hold and transport the two workpieces W on the two supply rails 6a and 6b, in a state where the two workpieces are placed side by side in the right-left direction.

A workpiece heater 10 which heats the workpiece W from the undersurface side is arranged between the supply magazine 5 and the supply rail 6, that is, at a location of the relay rail 7. A known heating mechanism (for example, heating-wire heater, infrared heater, or the like) (not illustrated) is disposed on a top surface of the workpiece heater 10. The workpiece heater 10 is disposed to advance and retreat with respect to the undersurface side of the workpiece W which is held by the supply pickup 9 above the supply rail 6. Consequently, the workpiece W is preheated before being transported to the sealing mold 2 to be heated, and thereby extension of the workpiece W in the sealing mold 2 is suppressed. Besides, the workpiece heater 10 may be arranged at the workpiece loader 3 without being arranged at the location of the relay rail 7.

The workpiece loader 3 includes integrally a first holding part 3A which has two rows of right and left workpiece holding parts 3a and 3b at a front side (lower side in FIG. 1) and a second holding part 3B which has two rows of right and left molded-product holding parts 3c and 3d at a rear side (upper side in FIG. 1). Consequently, since the configuration of the apparatus can be not only simplified and decreased in side, but also a configuration in which both the workpiece W and the molded product Wp are simultaneously transported two by two can be realized, a processing time can also be shortened. Incidentally, a loader including the first holding part 3A and a loader including the second holding part 3B may be separately configured.

The workpiece W transported by the supply pickup 9 is placed at the first holding part 3A, when the workpiece is moved to a location at a side (for example, right side in FIG. 1) with respect to the supply rail 6. In a case of delivery of the workpiece W, the supply pickup 9 is lifted again after a pre-heating process over the supply rail 6 and continues to move to the right side, thereby, passing on to the first holding part 3A positioned at the right side of the supply rail 6. The first holding part 3A has the two workpiece holding parts 3a and 3b which hold the placed workpiece W. Each of the workpiece holding parts has a known holding mechanism (for example, configuration in which a holding claw is arranged to pinch the workpiece, configuration in which a suction hole communicating with a suction device is arranged to suction the workpiece, or the like).

The two workpiece holding parts 3a and 3b of the first holding part 3A are configured to be arranged in two rows side by side in the right-left direction at positions corresponding to the two workpieces W held by the supply pickup 9. In other words, the workpieces W can be held side by side to have a longitudinal direct thereof in parallel.

Consequently, the two workpieces W heled side by side in the right-left direction by the supply pickup 9 can be simultaneously placed at the two workpiece holding parts 3a and 3b to be transported to the sealing mold 2 without rearrangement, while the two workpieces maintain the same arrangement.

In addition, the workpiece loader 3 that holds the workpiece W by the first holding part 3A is configured to be movable in the front-rear, right-left, and up-down directions. The movement in the right-left direction enables the workpiece W to be transported from the workpiece processing unit A to the press unit C. On the other hand, the movement in the front-rear direction enables the workpiece W to be transported from the outside to the inside of the sealing mold 2 (that is, between an upper mold and a lower mold in an opened state).

Further, the movement in the up-down direction enables the workpiece W to be transported (delivered) to a predetermined holding location of the upper mold inside the sealing mold 2.

Next, the second holding part 3B that transports the molded product Wp from the sealing mold 2 to a predetermined location outside the mold has molded-product holding parts 3c and 3d which hold the molded products Wp. Each of the molded-product holding parts has a known holding mechanism (for example, configuration in which a holding claw is arranged to pinch the molded product, configuration in which a suction hole communicating with a suction device is arranged to suction the molded product, or the like). The second holding part 3B is configured to have the two molded-product holding parts 3c and 3d arranged side by side in the right-left direction at positions corresponding to the two molded products Wp held by the sealing mold 2 after the resin sealing. Consequently, the two molded products Wp heled side by side in the right-left direction by the sealing mold 2 (upper mold) can be simultaneously placed at the two molded-product holding parts 3c and 3d to be transported outside the sealing mold 2 without rearrangement, while the two molded products maintain the same arrangement.

In addition, the workpiece processing unit A includes a first storage pickup 11 that holds the molded product Wp placed on the second holding part 3B to transport the molded product to a predetermined location and a second storage pickup 12 that holds the molded product Wp placed at the first storage pickup 11 to transport the molded product to a predetermined location within the workpiece processing unit. Both the first and second storage pickups are mechanisms that hold the molded product Wp and have a known holding mechanism (for example, configuration in which a holding claw is arranged to pinch the workpiece, configuration in which a suction hole communicating with a suction device is arranged to suction the workpiece, a mechanism that performs simple placement, or the like) (not illustrated).

The first storage pickup 11 according to the embodiment is configured to be movable in the right-left direction. Consequently, the first storage pickup holds the molded product Wp placed on the second holding part 3B to transport the molded product to the second storage pickup 12. Here, the molded products Wp are sandwiched and stay in delivery between the first storage pickup 11 and the second storage pickup 12, thereby, being cooled while being flattened such that warpage or distortion of the molded products Wp may be inhibited. The first storage pickup 11 has a configuration in which the holding mechanisms are arranged side by side in two rows in the right-left direction at positions corresponding to the two molded products Wp placed on the second holding part 3B (two rows of molded-product holding parts 3c and 3d). The second storage pickup 12 is movable in the up-down direction and holds the molded product Wp placed on the second storage pickup 12 to transport the molded product to a storage rail (not illustrated). The molded product Wp is pushed to be stored from the storage rail (not illustrated) to the storage magazine by a known pusher (not illustrated) or the like.

(Press Unit)

A configuration of the press unit C of the compression-molding apparatus 1 is described in detail. First, the press unit C includes the sealing mold 2 having a pair of molds (for example, a plurality of mold blocks made of alloy tool steel, mold plate, mold pillar, or an assembly of other members) which are opened and closed. In the embodiment, of the pair of molds, one mold at the upper side in a vertical direction is referred to as an upper mold, and the other mold at the lower side is referred to as a lower mold. The upper mold and the lower mold of the sealing mold 2 approach each other and are separated from each other, and thereby mold opening and mold closing are performed. In other words, the vertical direction is a mold opening/closing direction.

Besides, the sealing mold 2 is opened and closed by a known mold opening/closing mechanism (not illustrated). For example, the mold opening/closing mechanism is configured to include a pair of platens, a plurality of connecting mechanisms (tie bars or pillars) over which the pair of platens is arranged, a driving source (for example, electric motor) which drives (lifts and lowers) the platens, a driving transfer mechanism (for example, toggle link), or the like (driving mechanisms not illustrated).

Here, the sealing mold 2 is disposed between the pair of platens of the corresponding mold opening/closing mechanism. In the embodiment, the upper mold as a fixed mold is assembled to a fixed platen (platen which is fixed to the connecting mechanisms), and the lower mold as a movable mold is assembled to a movable platen (platen which is lifted and lowered along the connecting mechanisms). However, the configuration is not limited thereto, and the upper mold may be the movable mold, and the lower mold may be the fixed mold. Otherwise, both the upper mold and the lower mold may be the movable mold.

The press unit C is a device that supplies the workpiece (molding target) W and performs compression molding, using the sealing mold 2. The sealing mold 2 holds the workpiece W by the upper mold, supplies the sheet-shaped resin R by covering the cavities 2a and 2b arranged in the lower mold with the film F, performs a clamping operation of the upper mold and the lower mold, and immerses the workpiece W in the melted resin R to perform resin molding thereof. The appropriate amount of sheet-shaped resin R can be supplied together with the film F to the lower-mold cavity movable sealing mold 2. Besides, in a device having a cavity in the upper mold as will be described below, the sheet-shaped resin R is supplied to the workpiece W to be set on the lower mold, and the upper mold cavity is covered with the film F to perform the compression molding.

Besides, the compression-molding apparatus 1, as another example of the press unit C, may have one cavity in one lower mold, may dispose one workpiece W (for example, assuming a case where a circular semiconductor wafer, a square or rectangular substrate, or the like is used as a substrate) to perform the resin sealing, and may obtain one molded product. Incidentally, instead of the workpiece processing unit A, a transport robot including a robot hand which takes out the workpiece W from the supply magazine 5, stores the molded product Wp in the storage magazine, or the like may be arranged.

(Resin Supply Unit)

A configuration of the resin supply unit D of the compression-molding apparatus 1 is descried in detail together with a supply operation of the film F and the sheet-shaped resin R. As described above, the resin supply unit D is a unit that performs supply or the like of the film F and the sheet-shaped resin R. In the embodiment, when the film F and the sheet-shaped resin R are transported to the sealing mold 2, a rectangular frame-shaped transport tool 20 is used as a tool to hold and transport the film and the sheet-shaped resin. That is, the use of the transport tool 20 enables the sheet-shaped resin R to be held on the film F and be transported by the resin loader 4. In addition, the transport tool 20 can hold the films F side by side with longitudinal directions of the films parallel to each other.

Figures 3A, 3B:
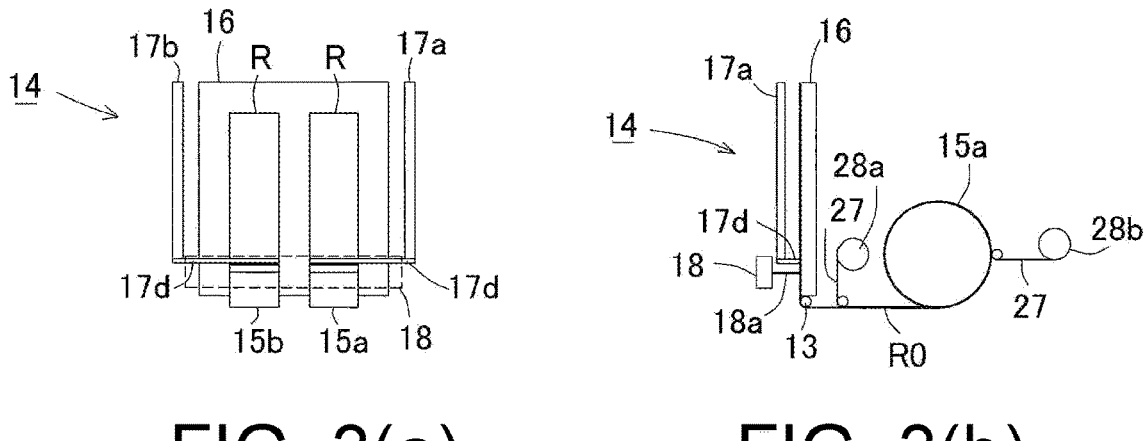
FIGS. 3(a) and 3(b) are a plan view and a right side view of the resin supply part in FIG. 2.

As illustrated in FIGS. 3(a) and 3(b), a resin supply part 14 includes a pair of resin rolls 15a and 15b into which the long resin sheet R0 is wound. The long resin sheet R0 is assumed to be in a state of flexible resin molded into a sheet shape having a predetermined width and a predetermined thickness in advance. A cutting table 16, sheet unwinding mechanisms 17a and 17b, and a sheet cutter 18 are all arranged above the resin rolls 15a and 15b. Leading end portions of the long resin sheets R0 unwound from the resin rolls 15a and 15b are unwound on the cutting table 16 through the guide roller 13 and are chucked or suctioned at a sheet fixing part 17d of the sheet unwinding mechanisms 17a and 17b to be unwound by a predetermined length on the cutting table 16. The sheet cutter 18 calculates an amount of resin required for each workpiece W depending on a mounting ratio of the electronic components Wt on the plate-shaped member Wb or a total volume of the electronic components Wt, which are detected by the workpiece measuring unit 8 (refer to FIG. 1), and cuts out and supplies the sheet-shaped resin R by an appropriate amount for the one-time compression molding from the resin sheet R0 formed to be long and have a predetermined width and a predetermined thickness from a resin volume corresponding to a required amount of resin.

Figure 4A:
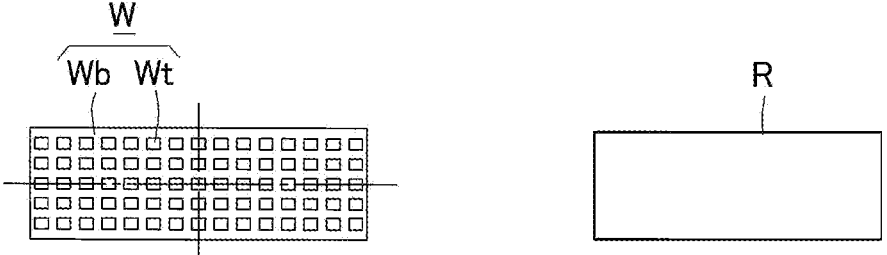
FIGS. 4(a) and 4(b) are schematic views illustrating a relationship between a chip mounting ratio and a supply amount of sheet-shaped resin on a workpiece in FIG. 1.
Figure 4B:
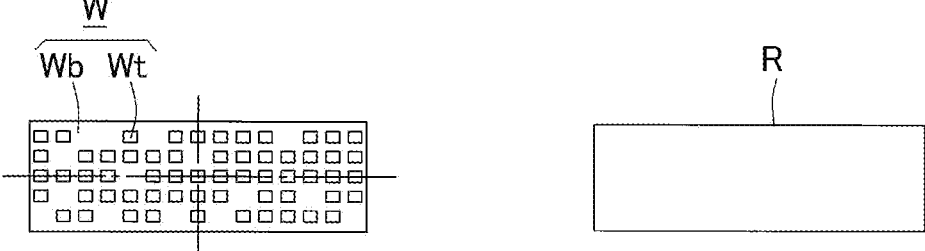

Specifically, the sheet-shaped resin R is cut out by an amount of resin depending on the mounting ratio of the electronic components Wt which is detected by the work-piece measuring unit 8 (refer to FIG. 1), based on an amount Z (volume conversion amount) of resin required for a case where the electronic components Wt are mounted to cover 100% of the plate-shaped member Wb illustrated in FIG. 4(*a*).

As illustrated in FIG. 4(*b*), when the mounting ratio of the electronic components Wt is 80% for example, the sheet-shaped resin R is cut out by 1.2 Z (volume conversion amount) of the amount of resin obtained by adding resin depending on the result. The amount (volume conversion amount) of sheet-shaped resin R is determined by a cutting length of the long resin sheet R0 having the predetermined width and thickness. Incidentally, the amount of resin may be determined by being finely adjusted, regarding a con-traction coefficient or the like of resin as necessary.

Consequently, the resin supply part 14 can supply the appropriate amount of sheet-shaped resin R without redun-dancy or deficiency for one-time compression molding for each workpiece W.

In addition, in the resin supply part 14, the appropriate amount of sheet-shaped resin R may be cut out depending on a volume of the electronic components Wt mounted on the plate-shaped member Wb. Specifically, a required resin volume may be calculated by subtracting the volume of the electronic components Wt mounted on the plate-shaped member Wb from a volume of cavities 2*a* and 2*b* of the sealing mold 2 such that the appropriate amount of sheet-shaped resin R may be cut out.

As illustrated in FIG. 4(*a*), a volume (P-Q) of resin is calculated by subtracting a total volume Q of the electronic components Wt from a cavity volume P obtained in a case where the electronic components Wt are mounted to cover 100% of the plate-shaped member Wb such that the appro-priate amount of sheet-shaped resin R is cut out. As illus-trated in FIG. 4(*b*), when the mounting ratio of the electronic components Wt on the workpiece W is 80%, a resin volume (P-0.8Q) is calculated by adding an amount of 20% as a deficient amount such that the appropriate amount of sheet-shaped resin R is cut out. The resin volume of sheet-shaped resin R which is supplied to the cavities 2*a* and 2*b* is determined by a cutting length of the long resin sheet R0 having the predetermined width and thickness. Incidentally, the resin volume may be determined by being finely adjusted, regarding a contraction coefficient or the like of resin as necessary.

The sheet cutter 18 is to cut the long resin sheet R0 unwound on the cutting table 16 by the sheet unwinding mechanisms 17*a* and 17*b* by a predetermined length by a cutter blade 18*a*. An unwinding length of the long resin sheet R0 is accurately measured to be cut out. For example, the long resin sheet R0 may be accurately moved by a moving length of unwinding by suction or the like (including unwinding of a long film from a film roll to be described below) by a single-axis robot, a linear actuator, or the like, or the resin sheet R0 may be cut by directly measuring a length from an unwound leading end to a cutting location with a linear encoder or a linear scale. Further, image processing measurement may be performed with a project-ing area or the like, while imaging is performed by a camera. Consequently, the resin supply part 14 can supply the appropriate amount of sheet-shaped resin R without redun-dancy or deficiency for one-time compression molding for each workpiece W.

Incidentally, when the mounting ratio of the electronic components Wt or the volume of the electronic components Wt of the workpiece W is proved as data in the previous step, the appropriate amount of resin is calculated based on the data. The data may be data transmitted to the control unit of the compression-molding apparatus 1 or read by a reader from a two-dimensional coder or the like attached for each workpiece W.

In addition, the long resin sheet R0 to which a protective film 27 is attached at both surfaces or one surface thereof may be used as the resin rolls 15*a* and 15*b*. In this case, a step of peeling off the protective film 27 needs to be performed before cutting into the sheet-shaped resin R is performed. The protective film 27 peeled off on both sur-faces from the leading end portion of the resin sheet unwound from the resin rolls 15*a* and 15*b* may be connected to winding cores of film winding rolls 28*a* and 28*b* and respectively wound up.

The rectangular frame-shaped transport tool 20 in a state of not holding the film F and the sheet-shaped resin R is mounted on a preparation table 19, and suitable cleaning is performed. For example, the transport tool 20 carried out from the sealing mold 2 can cause malfunction, when the resin R is attached thereto. In this respect, a surface includ-ing a through-hole to be described below is cleaned with a brush or a suction mechanism (both not illustrated), and thereby the malfunction can be inhibited.

The preparation table 19 has a known holding mechanism (for example, configuration in which a holding claw is arranged to pinch the transport tool, configuration in which a suction hole communicating with a suction device is arranged to suction the transport tool, or the like) (not illustrated) as a mechanism which holds the transport tool 20 and has a transport-tool pickup 21 that holds and transports the transport tool 20 between a plurality of locations (table). Otherwise, a configuration can be employed, in which an uneven portion is arranged at an outer peripheral part of the transport tool 20, and the uneven portion is caught by a holding claw erected downward from an undersurface of the transport-tool pickup 21 such that the transport tool is held and transported. The transport-tool pickup 21 is configured to be movable in the front-rear, right-left, and up-down directions. Consequently, the transport-tool pickup 21 can hold the transport tool 20 placed on the preparation table 19 and transport the transport tool to a film table 22 and a resin supply table 25 to be described below.

The transport tool 20 is formed into the rectangular frame shape and has two rows of carrying-in film holing units which hold the pair of films F cut into a strip shape. A pair of resin feeding holes 20*a* and 20*b* formed in through-holes so as to expose the films F when viewed from the top surface is arranged at locations corresponding to the films F (loca-tions at which the films F are held). The resin feeding holes 20*a* and 20*b* are formed to correspond to the shape of the cavities 2*a* and 2*b* described above. In a state where the sheet-shaped resin R is dropped into the resin feeding holes 20*a* and 20*b* of the transport tool 20, with the film F as a bottom, the sheet-shaped resin is supplied to the sealing mold 2 (cavities 2*a* and 2*b*).

A pair of film rolls 24*a* and 24*b* into which the long films F are wound into a roll shape is arranged on the film table 22. Consequently, two films F having the same shape can be simultaneously supplied onto the film table 22. The film table 22 is disposed above (obliquely above in the embodi-ment) the film rolls 24*a* and 24*b*, and the films F unwound from the film rolls 24*a* and 24*b* are cut into a strip shape having a predetermined length and is held. For example, the film table 22 and the film rolls 24*a* and 24*b* are disposed such that the film is transported in the up-down direction, an installation area of the apparatus is to be reduced.

In addition, unwinding of the film rolls 24a and 24b to the film table 22 may be performed by a configuration in which an end portion is sandwiched to be unwound, a configuration in which a driving-type roller arranged close to the film table 22 performs the unwinding, or other configurations. In addition, a known film cutting mechanism 24c (for example, a fixed blade cutter, a hot-melted cutter, or the like) (not illustrated) is used as a mechanism that cuts the long film F. In addition, a known holding mechanism (for example, configuration in which a suction hole communicating with a suction device is arranged to suction the film or the like) (not illustrated) is used as the mechanism that holds the two films F. On the film table 22, the transport tool 20 is placed to overlap the films F that are cut here.

A plurality of suction holes (not illustrated) which hold the film F by generating a suction force are arranged around the resin feeding holes 20a and 20b of the transport tool 20. Besides, the suction hole is configured to transmit the suction force generated by the suction device (not illustrated) via the suction hole (not illustrated) arranged in the transport-tool pickup 21. According to the above-described configuration, the two films F can be held in a state of being suctioned side by side in the right-left direction by an undersurface of the transport tool 20 transported on the film table 22 by the transport-tool pickup 21. Besides, a configuration may be employed, in which the holding claw sandwiches and holds an outer periphery of the film F.

The resin supply table 25 is supplied at a side (for example, right side) of the film table 22. The resin supply table 25 is a mechanism that holds the transport tool 20 placed on the pair of films F and has a known holding mechanism (for example, configuration in which a holding claw is arranged to pinch the transport tool, configuration in which a suction hole communicating with a suction device is arranged to suction the transport tool, or the like) (not illustrated). Incidentally, the resin supply table 25 may not be arranged, and the resin supply unit may supply the transport tool 20 on the film table 22, or the sheet-shaped resin R may be supplied on the film F by the resin feeding holes 20a and 20b.

Figure 2:
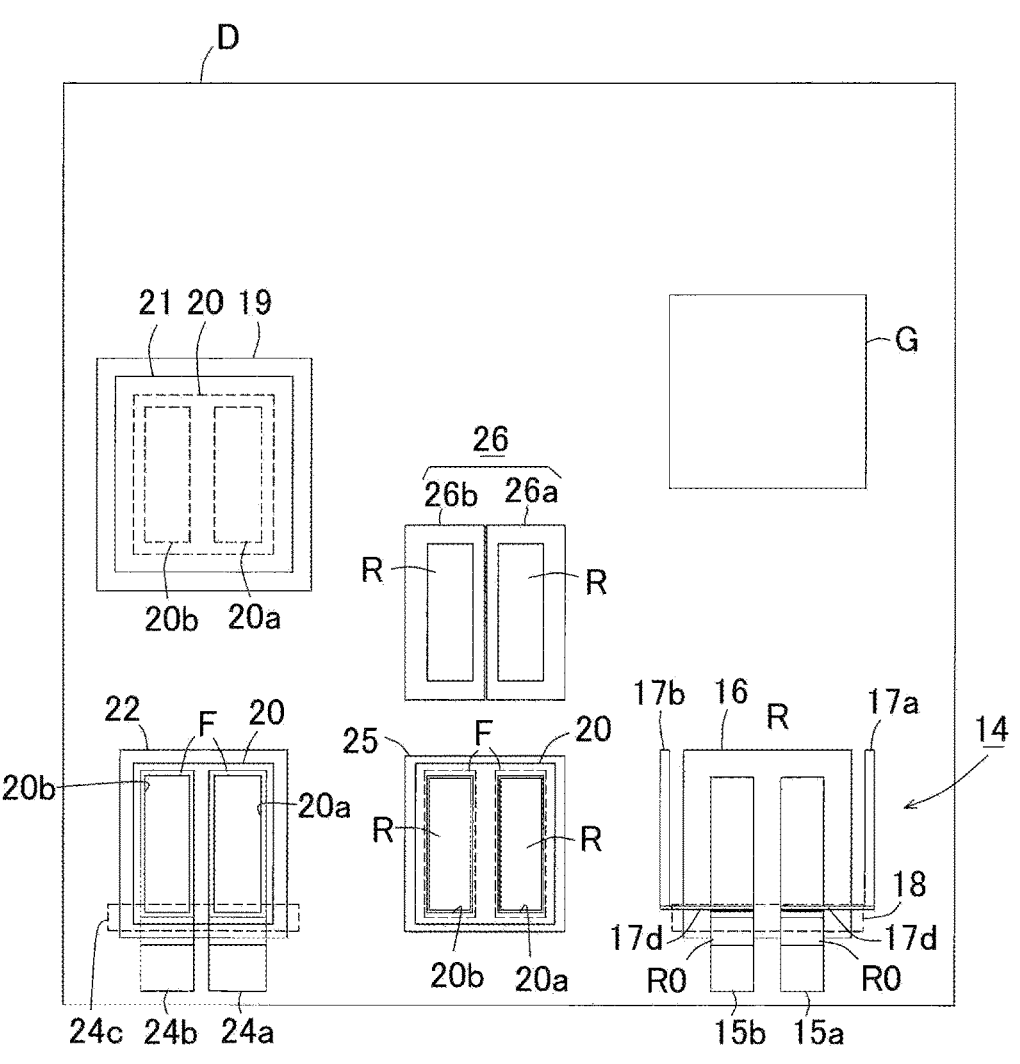
FIG. 2 is an enlarged layout configuration view of a resin supply part in FIG. 1.

Here, an example of a supply operation of the sheet-shaped resin R is described with reference to FIG. 2.

The resin supply part 14 determines the appropriate amount (volume conversion amount) of resin amount without redundancy or deficiency for one-time compression molding for each workpiece W depending on the mounting ratio of the electronic components Wt or the volume of the electronic components Wt obtained by the workpiece measuring unit 8. A cutting length of the resin sheet having the predetermined width and thickness is determined with respect to the appropriate amount of rein for each workpiece W. For example, the volume of the electronic components Wt mounted on the workpiece W is calculated depending on whether or not the electronic components Wt is mounted, a mounting height of the electronic components, or the like, based on a result of "measurement of thickness", and a volume obtained by subtracting a total volume of the electronic components Wt from a package volume (empty cavity volume P), on which the electronic components Wt are not mounted, is used as a volume of the appropriate amount of resin required during molding. Since the long resin sheet R0 have the predetermined width and thickness, the volume of the appropriate amount of resin can be calculated by adjusting the length. The sheet cutter 18 cuts the resin sheet R0 unwound on the cutting table 16 by the sheet unwinding mechanisms 17a and 17b by a predetermined length. Besides, since amounts required for the two workpieces W for one-time molding are different from each other, the sheet unwinding mechanisms 17a and 17b can individually cut predetermined lengths, respectively.

The appropriate amount of cut sheet-shaped resin R is transported to measurement stages 26a and 26b by a resin pickup mechanism (not illustrated). The amounts of resin corresponding to the appropriate amounts of resin are measured at the measurement stages 26a and 26b, respectively. After the measurement, whether or not the sheet-shaped resins R are each cut to have a target appropriate amount is determined, the sheet-shaped resin R out of a range of the appropriate amount is discarded to a resin disposal box (not illustrated), and the resin supply part 14 cuts the appropriate amount of sheet-shaped resin R. The resin pickup mechanism feeds the appropriate amount of sheet-shaped resin R into the resin feeding hole 20a of the transport tool 20 placed on the film F placed on the resin supply table 25. The transport tool 20, the film F, and the sheet-shaped resin R placed on the resin supply table 25 are transported to the sealing mold 2 (lower mold) by the resin loader 4 to be described below.

Incidentally, the cutting length of the sheet-shaped resin R may be finely adjusted through feedback control, after the measurement at the measurement stage 26 or from a resin amount (volume conversion amount) of molded product Wp after molding. The control unit may adjust the cutting length of the sheet-shaped resin R for each workpiece W from molded-product information (molding thickness or the like of molded product) and may adjust the cutting length for each lot. Consequently, accuracy of the resin supply can be enhanced for each lot. In addition, the workpiece information including thickness information of the workpiece W can be recorded in association with data of cutting length or the like, and thereby the appropriate amount of resin is supplied to various workpieces W to enhance the molding quality of a molded product.

When the resin supply unit D is used, the sheet-shaped resin R can be supplied, and thereby supply and transport can be performed without dust, and resin corresponding to a deficient volume can be supplemented even when the mounting amount of the electronic components for each workpiece W is changed. Hence, the appropriate amount of resin can be supplied such that the compression molding can be performed.

In this case, the sheet-shaped resin R may be a sheet-shaped resin R formed into a porous resin with a predetermined density or a sheet-shaped resin R having multiple through-holes with a predetermined density. Consequently, air is inhibited from infiltrating between the lower mold and the sheet-shaped resin R which is supplied to the film F such that generation of a void can be suppressed.

Figure 5A:
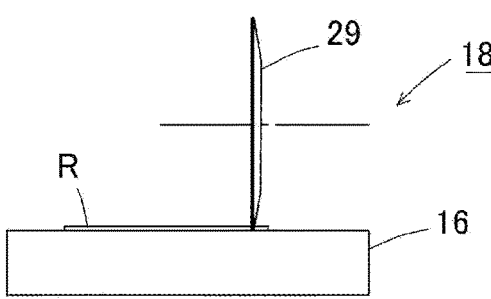
FIGS. 5A, 5B, and 5C are views illustrating a cutting example of the sheet-shaped resin.
Figure 5B:
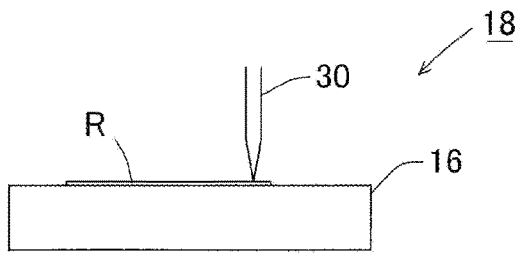
Figure 5C:
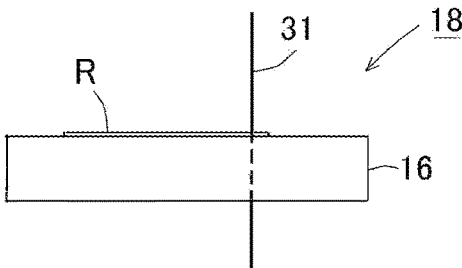

In addition, as the sheet cutter 18, a device that performs cutting work using a dicer blade 29 may be used as illustrated in FIG. 5A, a device that performs cutting using a laser or a water jet 30 may be used as illustrated in FIG. 5B, or a device that performs cutting using a wire cutter 31 may be used as illustrated in FIG. 5C, in addition to the cutter blade 18a.

Figure 6A:
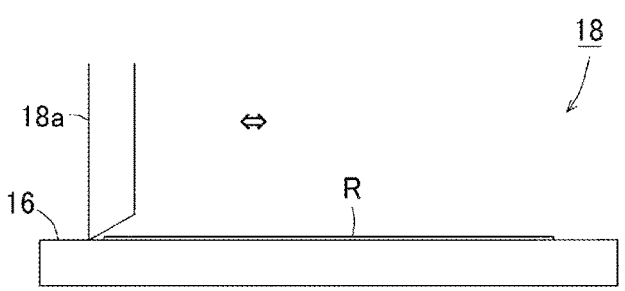
FIGS. 6A, 6B, 6C, and 6D are views illustrating another cutting example of the sheet-shaped resin.

In addition, as illustrated in FIG. 6A, the sheet cutter 18 may cut the sheet-shaped resin R by scanning the cutter blade 18a or may cut the sheet-shaped resin with scissors (not illustrated). Otherwise, as illustrated in FIG. 6B, the cutter blade 18a may be vertically moved along a cutting line of the sheet-shaped resin R to push and cut the sheet-shaped resin R.

Figure 6B:
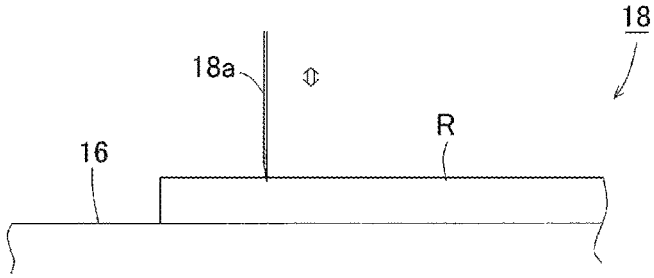
Figure 6C:
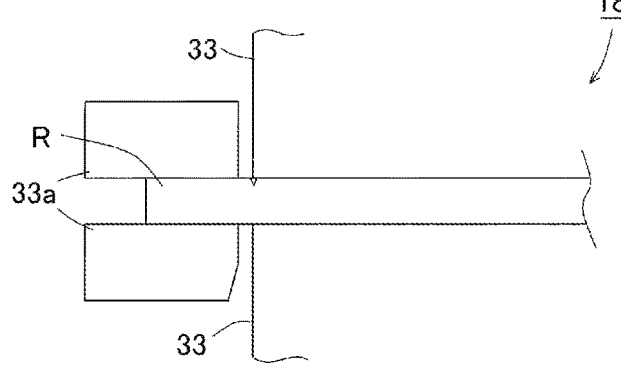
Figure 6D:
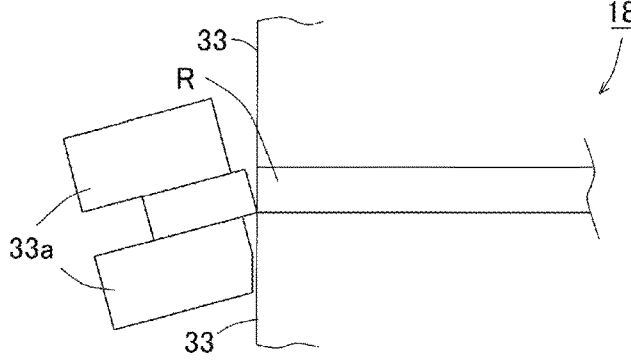

In addition, as illustrated in FIG. 6C, after shallow grooving is performed at a removal line with a cutter blade or the like in FIGS. 6A and 6B, a movable clamp 33a may be changed from a horizontal posture to a tilted posture such that the sheet-shaped resin R is removed to be broken off by a notch line as illustrated in FIG. 6D, in a state where the sheet-shaped resin R is sandwiched by a pair of upper and lower fixed clamps 33, and a cutting portion is sandwiched by the movable clamp 33a.

Figure 7:
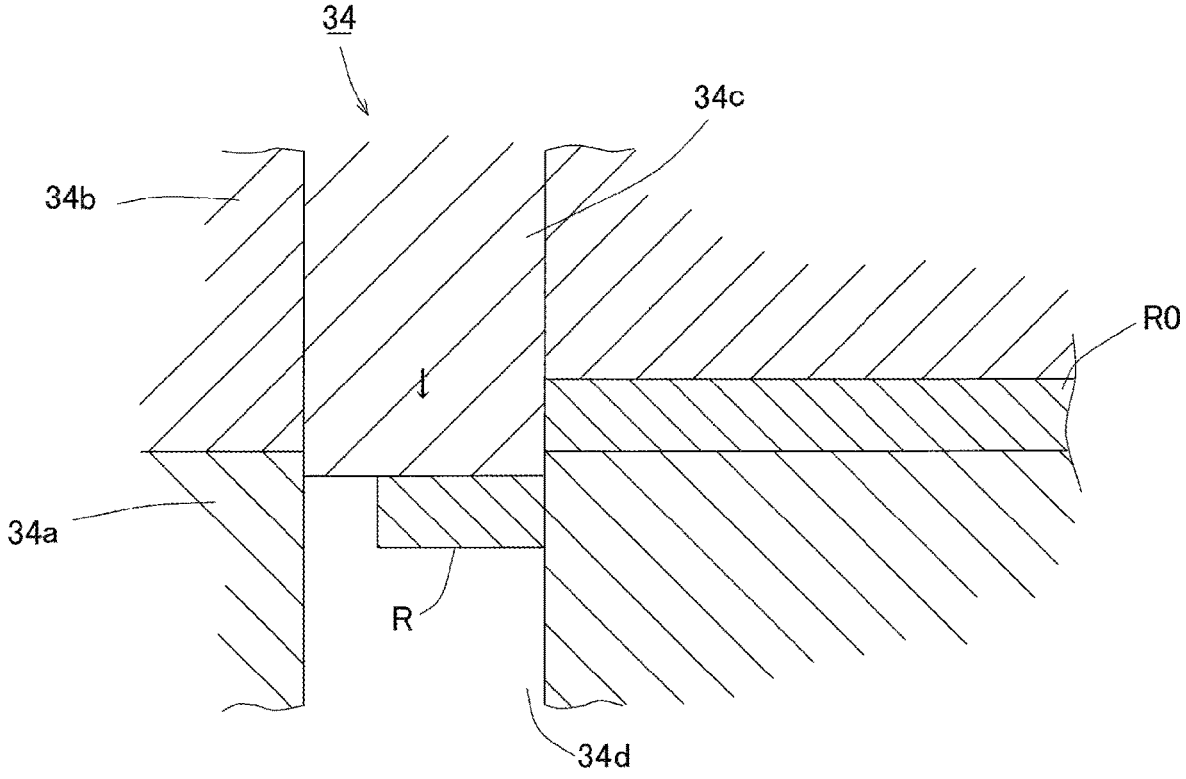
FIG. 7 is a view illustrating still another cutting example of the sheet-shaped resin.

As illustrated in FIG. 7, a press device 34 may be used as the sheet cutter 18 to cut the resin sheet R0. When a punch 34c is pressed toward a die hole 34d while the long resin sheet R0 placed on a die 34a is held by a stripper plate 34b, the sheet-shaped resin R having a predetermined length may be cut.

Figure 8A:
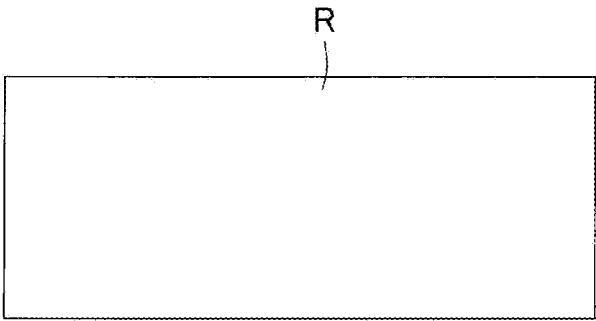
FIGS. 8(a) and 8(b) are views illustrating a cutting example of the sheet-shaped resin and layout within a transport tool to which the cut sheet-shaped resin is supplied.
Figure 8B:
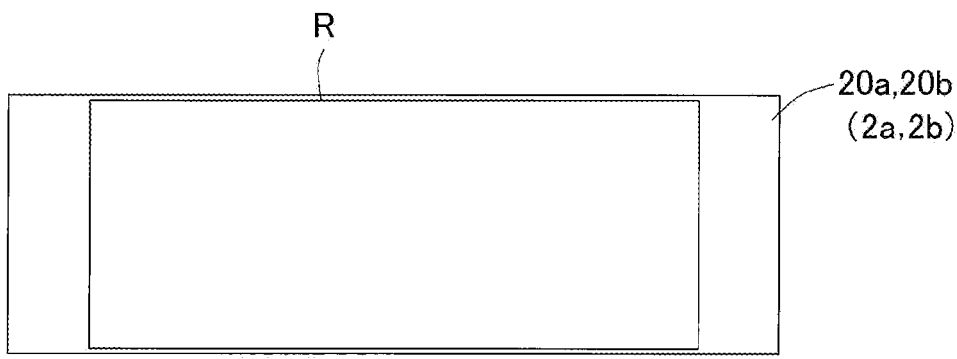

FIG. 8(a) is a view illustrating a state of the sheet-shaped resin R, and FIG. 8(b) is a view illustrating placement of the sheet-shaped resin R which is fed into the resin feeding holes 20a and 20b (cavities 2a and 2b) of the transport tool 20. The sheet-shaped resin R may be disposed by performing X-Y moving adjustment of a location thereof at centers in the resin feeding holes 20a and 20b of the transport tool 20 such that the melted resin flows as small as possible in the cavities 2a and 2b.

Next, a configuration of the resin loader 4 will be described with reference to FIG. 1. The resin loader 4 receives the transport tool 20 placed on the resin supply table 25, together with the film F and the sheet-shaped resin R in a transport-tool holding part 4a on an undersurface thereof, transports the transport tool, the film, and the sheet-shaped resin to the sealing mold 2 (lower mold), and then transports only the transport tool 20 to the preparation table 19 described above. Besides, the resin loader 4 has a known holding mechanism (for example, configuration in which a holding claw is arranged to pinch the transport tool, configuration in which a suction hole communicating with a suction device is arranged to suction the transport tool, or the like) as the transport-tool holding part 4a that holds the transport tool 20. Further, the resin loader 4 has the suction hole communicating with a suction hole of the transport tool 20 that is held at a predetermined location for generating a suction force by a suction device (not illustrated). A holding claw that pinches and holds outer peripheries of the two films F may be arranged on the undersurface of the transport tool 20.

In addition, the resin loader 4 includes a carrying-out film holding part 4b that holds the film (used film) F which remains in the lower mold after the resin-sealed molded product Wp is taken out from the sealing mold 2 (here, upper mold) and transports the film F to a predetermined location (film disposer G to be described below). Besides, the carrying-out film holding part 4b has a known holding mechanism (for example, configuration in which a suction hole communicating with a suction device is arranged to suction the film or the like) which holds the used film F.

The resin loader 4 according to the embodiment is configured to be movable in the front-rear, right-left, and up-down directions. Movement in the right-left direction enables a transport operation of the transport tool 20 (state in which the two films F each loaded with the sheet-shaped resin R are held) to be performed to the press unit C from the resin supply table 25. Movement in the front-rear direction enables a transport operation of the transport tool 20 (state in which the two films F each loaded with the sheet-shaped resin R are held) to be performed from the outside to the inside of the sealing mold 2 (that is, between the upper mold and the lower mold in a mold opened state).

In addition, the carrying-out film holding parts 4b are configured to be arranged side by side in the right-left direction at positions corresponding to the two cavities 2a and 2b of the sealing mold 2 (lower mold). Consequently, the two used films F which are held side by side in the right-left direction by the sealing mold 2 (lower mold) after resin sealing can be simultaneously held and transported side by side in the right-left direction.

In addition, the resin loader 4 includes integrally the transport-tool holding part 4a and the carrying-out film holding part 4b, and thereby the resin loader 4 is configured to be movable in the front-rear, right-left, and up-down directions. Besides, as a variation example, a resin loader including the transport-tool holding part 4a and the carrying-out film holding part 4b separately may be arranged.

The film disposer G is formed into a box shape of which an upper portion (top surface portion) is opened. Consequently, when the carrying-out film holding part 4b that transports the used film F reaches a location immediately above the film disposer G, release of the used film F from the carrying-out film holding part 4b causes the used film F to fall and to be stored in the film disposer G.

According to the configuration, the appropriate amount of sheet-shaped resin R can be transported for one-time compression molding depending on a mounting amount of the electronic components for each workpiece W to the sealing mold 2 by the resin supply unit D such that compression molding can be performed. Hence, since resin dust is not scattered during the resin supply, and further the appropriate amount of resin can be supplied without redundancy or deficiency to perform resin sealing for each workpiece W, the molding quality of a molded product can be improved, and the molded product does not have unnecessary resin.

A case where the appropriate amount of sheet-shaped resin R is supplied to the rectangular plate-shaped member Wb (strip substrate) to perform the compression molding is described; however, the resin supply unit D may be a device that supplies the appropriate amount of sheet-shaped resin R to a circular semiconductor wafer as the plate-shaped member Wb to perform compression molding. Hereinafter, the same reference signs are assigned to the same members as those of the resin supply unit D illustrated in FIG. 2, the same description is quoted. Incidentally, the workpiece W has the electronic components Wt mounted on the plate-shaped member Wb (semiconductor wafer-shaped).

Figure 9:
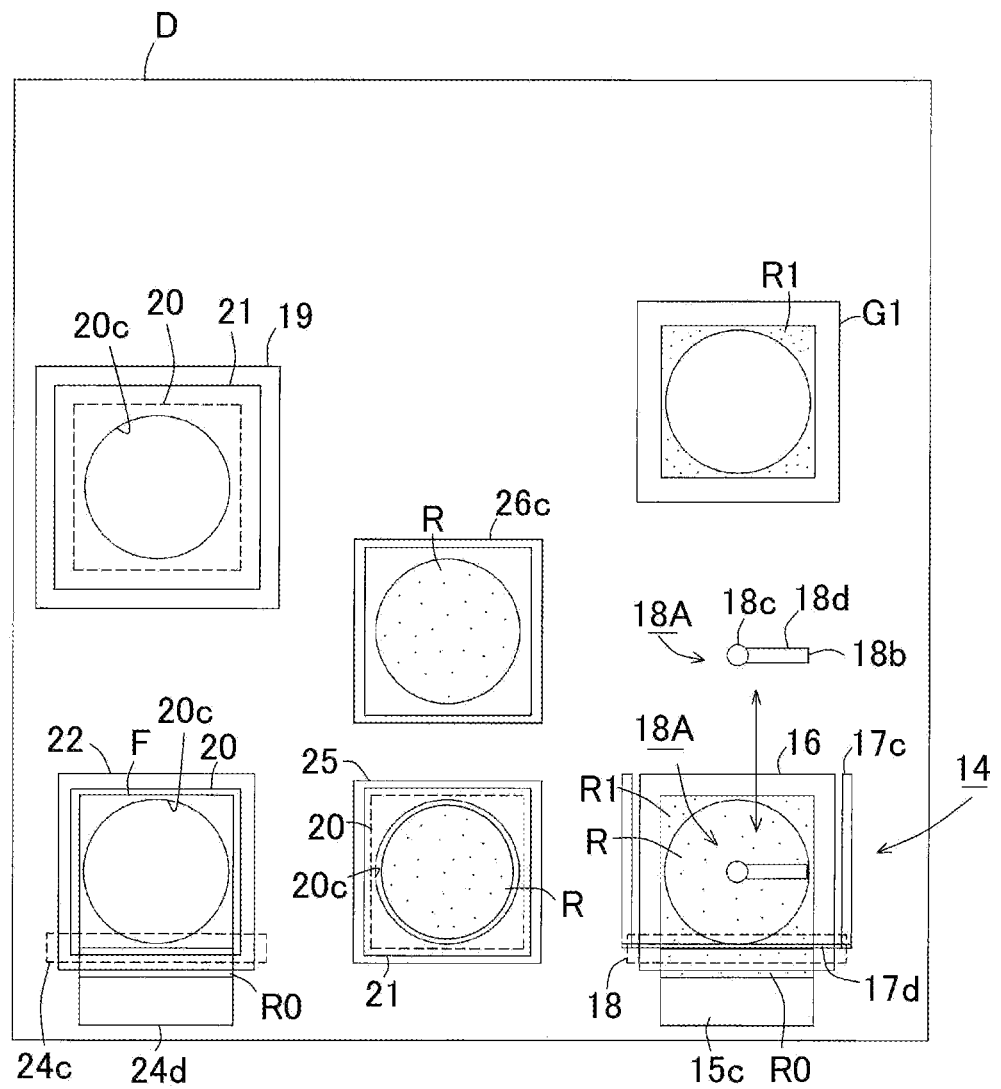
FIG. 9 is a layout configuration view of a resin supply part with respect to a workpiece according to another example.

In FIG. 9, the compression-molding apparatus 1 is configured to have one cavity arranged in one lower mold of the press unit C, dispose one workpiece W to perform the compression molding, and obtain one molded product Wp. In this case, a wide film which is wider than the film F serving as the above-described strip-shaped film for workpiece molding is used as the film F which is supplied from a film roll 24d to the film table 22 and is cut by the film cutting mechanism 24c. As the wide film, it is easy to use a single sheet type of square or rectangular film F wider than the strip-shaped film for workpiece molding. However, a single sheet type of round film F wider than the strip-shaped film for workpiece molding may be used as the wide film. In addition, a transport tool which has a rectangular external appearance and is equipped with a resin feeding hole (round hole) 20c at a center portion may be used as the transport tool 20 which is supplied to the preparation table 19; however, the external appearance thereof may be round.

As illustrated in FIG. 9, the resin supply part 14 includes a resin roll 15c into which the long resin sheet R0 is wound. Regarding the resin roll 15c, since the resin sheet R0 in which the protective film 27 is attached to both surfaces or one surface thereof is used, as in FIG. 3, the process of peeling off the protective film 27 needs to be performed before cutting into the sheet-shaped resin R is performed; however, in a case of the sheet-shaped resin R where the protective film 27 is not required, the step of peeling may be omitted. The long resin sheet R0 is assumed to be in a state of flexible resin molded into a sheet shape having a predetermined thickness in advance. The cutting table 16, the sheet unwinding mechanism 17c, and the sheet cutter 18 are arranged above the resin roll 15c. The sheet cutter 18 cuts a fixed amount of the resin sheet R0 unwound on the cutting table 16 depending on the workpiece W. In addition, the movable sheet cutter 18A is arranged to be movable between a standby location out of the cutting table 16 and a cutting location which is approximately a center on the cutting table 16. The movable sheet cutter 18A is equipped with a cutter blade 18b at a distal end of a rotary arm 18d which rotates around a rotary shaft 18c. The rotary arm 18d is configured to have a telescopic length, an amount of resin required for each workpiece W is calculated as described later, and a length of the rotary arm 18d is adjusted such that a volume corresponds to the required amount of resin. A sheet holding member 17e which holds the resin sheet R0, when the resin sheet R0 is cut into a circular shape, and holds an end portion after cutting at a fixed amount cutting location is arranged at the sheet unwinding mechanism 17c.

The rectangular frame-shaped transport tool 20 in a state of not holding the film F and the sheet-shaped resin R is mounted on the preparation table 19, and suitable cleaning is performed.

The preparation table 19 has the transport-tool pickup 21 that holds the transport tool 20 to transport the transport tool between a plurality of predetermined locations (table).

The transport tool 20 has the resin feeding hole 20c formed as a through-hole such that the film F is exposed when viewed from the top surface. The resin feeding hole 20c is formed to correspond to the shape of the cavity. In a state where the sheet-shaped resin R is dropped into the resin feeding hole 20c of the transport tool 20, with the film F as a bottom, the sheet-shaped resin is supplied to the sealing mold 2.

The film roll 24d into which the long film F is wound to have a roll shape is arranged on the film table 22. Consequently, the film F having can be supplied on the film table 22. On the film table 22, the film F unwound from the film roll 24d is cut by a predetermined length and is held. In addition, a known film cutting mechanism 24c (for example, a fixed blade cutter, a hot-melted cutter, or the like) (not illustrated) is used as a mechanism that cuts the long film F. The transport tool 20 is mounted to overlap the cut film F at the film table 22.

A plurality of suction holes (not illustrated) which hold the film F by generating a suction force are arranged around the resin feeding hole 20c of the transport tool 20. Besides, this configuration is similar to the above-described configuration in that the suction hole is configured to transmit the suction force generated by the suction device (not illustrated) via the suction hole (not illustrated) arranged in the transport-tool pickup 21.

The resin supply table 25 is supplied at a side (for example, right side) of the film table 22. The resin supply table 25 is a mechanism that holds the transport tool 20 placed on the pair of films F and has a known holding mechanism (for example, configuration in which a holding claw is arranged to pinch the transport tool, configuration in which a suction hole communicating with a suction device is arranged to suction the transport tool, or the like) (not illustrated). Incidentally, the resin supply table 25 may not be arranged, and the transport tool 20 may be supplied onto the film table 22, or the sheet-shaped resin R may be supplied on the film F by the resin feeding hole 20c.

A measurement stage 26c measures the appropriate amount of sheet-shaped resin R cut by the resin supply part 14. The sheet-shaped resin R is transported to the measurement stage 26c from the cutting table 16 by the resin pickup mechanism (not illustrated). The amount of resin corresponding to the appropriate amount of resin is measured at the measurement stage 26c. After the measurement, whether or not the sheet-shaped resin R is cut to have a target appropriate amount is determined, the sheet-shaped resin R out of a range of the appropriate amount is discarded to a resin disposal box (not illustrated), and the resin supply part 14 cuts the appropriate amount of sheet-shaped resin R. After measurement of the appropriate amount, the resin pickup mechanism feeds the sheet-shaped resin R into the resin feeding hole 20c of the transport tool 20 placed on the resin supply table 25.

In addition, as illustrated in FIG. 9, separately from the film disposer G, a resin disposer G1 that discards redundant resin R1 after the sheet-shaped resin R is cut is arranged in the vicinity of the stand-by position of the sheet cutter 18. When the sheet-shaped resin R is cut out into a circular shape from the long resin sheet R0, redundant resin R1 is produced therearound. The redundant resin R1 cut by the sheet cutter 18 is transported to the resin disposer G1 and is discarded by the resin pickup mechanism (not illustrated).

Here, a supply operation of the resin supply part 14 is described with reference to FIGS. 10(a) to 10(f). In FIG. 10(a), a leading end portion of the long resin sheets R0 unwound from the resin roll 15c is unwound on the cutting table 16 passing over the guide roller 13 (refer to FIG. 3B) and is chucked or suctioned at the sheet fixing part 17d of the sheet unwinding mechanism 17c to be unwound by a predetermined length on the cutting table 16. A state in which the resin sheet R0 is unwound on the cutting table 16 is illustrated in FIG. 10(b).

Next, in FIG. 10(c), a leading end location of the resin sheet R0 unwound on the cutting table 16 is held by the sheet fixing part 17d, and a following end location is held by the sheet holding member 17e. In addition, the movable sheet cutter 18A approaches the resin sheet R0 unwound from the stand-by location outside the cutting table 16. In this case, at the movable sheet cutter 18A, the rotary shaft 18c approaches a location which is approximately a center of the cutting table 16. The movable sheet cutter 18A calculates an amount of resin required for each workpiece W depending on a mounting ratio of the electronic components Wt on the semiconductor wafer or a total volume of the electronic components Wt, which are detected by the workpiece measuring unit 8 (refer to FIG. 1), and adjusts a length of the rotary arm 18d such that the resin volume corresponds to the required amount of resin.

Next, as illustrated in FIG. 10(d), while the cutter blade 18b arranged at the distal end of the rotary arm 18d penetrates the long resin sheet R0, the circular sheet-shaped resin R is cut by circling in a clockwise direction to have a predetermined radius, for example. The appropriate amount of sheet-shaped resin R is cut for one-time compression molding from the long resin sheet R0 formed to have the predetermined thickness.

In FIG. 10(e), the movable sheet cutter 18A returns to the stand-by location from the cutting table 16, when the cutting operation is ended. Then, the sheet cutter 18 cuts the resin sheet R0 by the fixed amount. The sheet-shaped resin R cut into a circular shape is transported to the measurement stage 26c by the resin pickup mechanism (not illustrated) such that the amount of resin is measured. The redundant resin R1 therearound is transported to the resin disposer G1 and is discarded by the resin pickup mechanism.

In FIG. 10(f), the sheet fixing part 17d of the sheet unwinding mechanism 17c is moved to the leading end location of the long resin sheet R0 cut by the fixed amount to chuck and suction the resin sheet to fix the resin sheet, and the next sheet-shaped resin R is cut.

The resin pickup mechanism (not illustrated) feeds the appropriate amount of sheet-shaped resin R measured at the measurement stage 26c into the resin feeding hole 20c of the transport tool 20 placed on the film F placed on the resin supply table 25. The transport tool 20, the film F, and the sheet-shaped resin R placed on the resin supply table 25 are transported to the sealing mold 2 (lower mold) by the resin loader 4.

In this manner, after a volume of the electronic components Wt is measured for each workpiece W, the appropriate amount of sheet-shaped resin R can be supplied without redundancy or deficiency by adjusting a cutting radius in a case of the circular workpiece W, based on data of the mounting ratio of the electronic components Wt.

Here, a resin-sealing method is described. Workpiece information on the mounting ratio of the electronic components Wt mounted or the total volume of the electronic components Wt is acquired for each workpiece W which is supplied from the workpiece supply unit A (workpiece supplier). The amount (volume conversion amount) of resin required for each workpiece W is calculated from the workpiece information. Specifically, a resin volume is calculated by subtracting the total volume of the electronic components from an empty cavity volume to obtain a volume of the sheet-shaped resin R, regarding a contraction coefficient of resin as necessary.

The appropriate amount of the sheet-shaped resin R is cut out without redundancy or deficiency for one-time compression molding for each workpiece W, depending on the required amount resin from the long resin sheet R0 having the predetermined width and thickness which is unwound by the resin supply part 14. Specifically, there is no need to have a predetermined cutting length in a case of the rectangular workpiece W, and there is no need to have a predetermined width of the resin sheet R0 in a case of the circular workpiece W, as long as a width is sufficient for the resin sheet to be cut out with the cutting radius. The cutting radius is adjusted in cutting out, and thereby the appropriate amount of sheet-shaped resin R is supplied for each workpiece W. Further, when the workpiece W have a random rectangular shape, an irregular shape, or the like, the appropriate amount of sheet-shaped resin R may be cut out into a predetermined shape over the entire periphery from the long resin sheet R0 having the predetermined thickness. The workpiece loader 3 transports the workpiece W to the sealing mold 2 (upper mold), and the resin loader 4 transports the appropriate amount of sheet-shaped resin R and the film F to the sealing mold 2. The sealing mold 2 clamps the workpiece W and performs the compression molding. Incidentally, the sheet-shaped resin R and the film F may be transported to the sealing mold 2.

According to the resin-sealing method, since the workpiece information on the mounting ratio of the electronic components is acquired for each workpiece W which is supplied from the workpiece supplier, and the appropriate amount of sheet-shaped resin R is cut out without redundancy or deficiency for one-time compression molding for each workpiece W depending on the mounting ratio of the electronic components Wt, the appropriate amount of resin can be supplied to the sealing mold 2 for each workpiece W, and the compression molding can be performed. Hence, the appropriate amount of resin can be supplied for a workpiece W having a different mounting amount of the electronic components Wt, a workpiece W including a plate-shaped member Wb having a different shape, or the like. Hence, since resin dust is not scattered during resin supply, and further the appropriate amount of resin can be supplied to perform resin sealing for each workpiece W, the molding quality of a molded product is improved, and the molded product Wp does not have unnecessary resin.

In addition, the film table 22 that can supply a film by switching between the narrow strip-shaped film for workpiece molding illustrated in FIG. 1 and the wide film illustrated in FIG. 9 may be arranged. In this case, the resin supply part 14 has to supply a film by switching between the film rolls 24a and 24b and the film roll 24d. In addition, the transport tool 20 prepared on the preparation table 19 has to be used by being switched between a strip substrate type and a semiconductor wafer type. In addition, the sheet cutter 18 has to be used by being switched between for a rectangular resin and a circular resin.

In addition, the configuration of the compression-molding apparatus 1 may be a configuration in which the resin supply unit D which is arranged at one side of the press unit C performs only supply of the sheet-shaped resin R corresponding to the mounting amount of electronic components to the sealing mold 2. In this case, a film transport device may be arranged to the press unit C to load and unload the film that covers the cavity surface.

The strip type and the circular type of workpiece are described in the example; however, the workpiece may have a large size with the rectangular (quadrangular) shape. In this case, the sheet-shaped resin R may have a quadrangular shape, may be cut by a predetermined length similar to the strip workpiece, and may be divided as necessary to be supplied. In addition, a plurality of sheet-shaped resins R may be supplied in an overlapping state into the resin feeding holes 20a, 20b, and 20c of the transport tool 20 as necessary or may be supplied side by side.

In the example, the lower-mold cavity movable compression-molding apparatus 1 is described; however, an upper-mold cavity movable compression-molding apparatus 1 that transports the appropriate amount of sheet-shaped resin R without redundancy or deficiency for one-time compression molding, together with the workpiece W, to the sealing mold 2.

Figure 11:
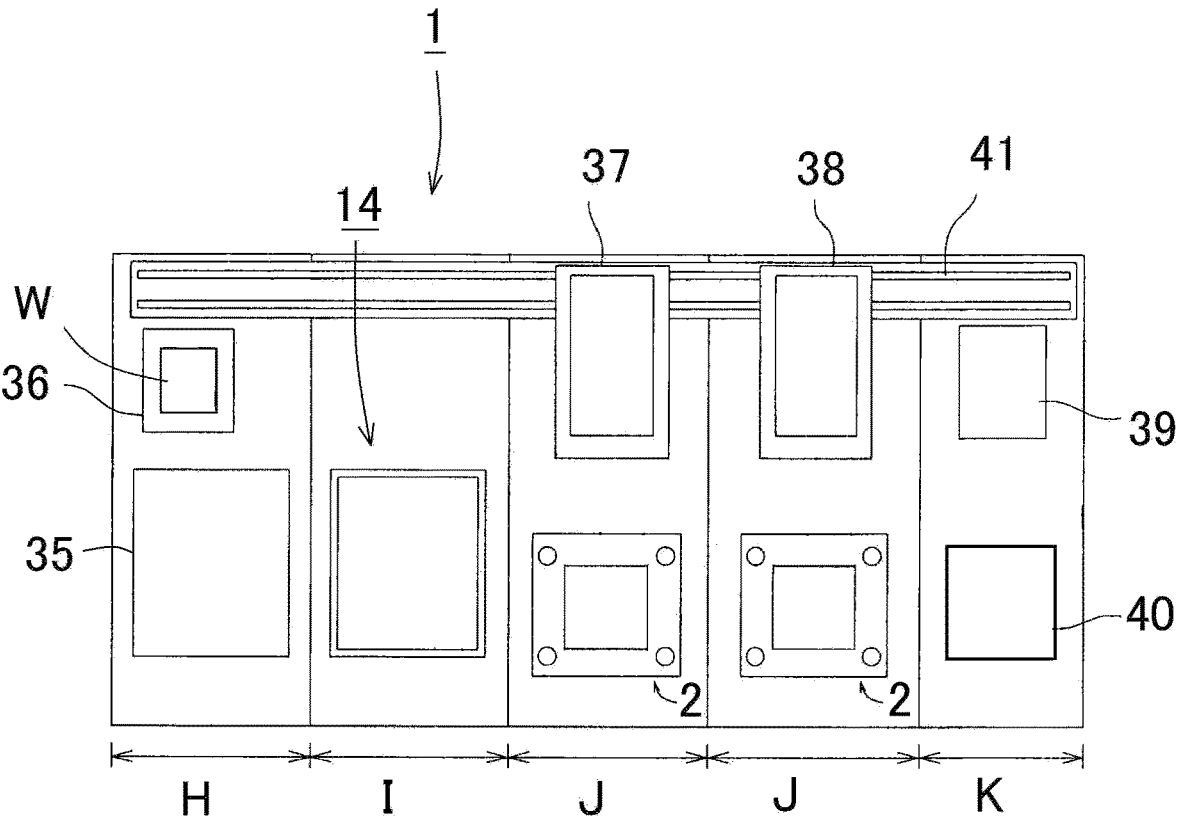
FIG. 11 is a layout configuration view illustrating an example of an upper-mold cavity movable compression-molding apparatus.

FIG. 11 illustrates the compression-molding apparatus 1 having an upper-mold cavity movable type of sealing mold 2. The compression-molding apparatus 1 has a configuration in which a workpiece supply unit H, a resin supply unit I, a press unit J, and a molded-product storing unit K are disposed side by side as separable units. Incidentally, the apparatus may have a configuration in which the units are all integrated. In the workpiece supply unit H, a workpiece W (plate-shaped member on which the electronic components are mounted, semiconductor wafer, or the like) before molding is inserted and stored in a slit in a supply magazine 35 and is taken out over the workpiece supply table 36.

The workpiece W is transported by a loader 37 to a resin supply unit I. The resin supply part 14 that supplies the sheet-shaped resin R is arranged at the resin supply unit I. The sheet-shaped resin is unwound by a sheet unwinding mechanism to a cutting table from a resin roll into which a long resin sheet having a predetermined width and a predetermined thickness is wound, and a sheet cutter cuts the resin sheet by a predetermined length or a predetermined radius for each workpiece W depending on the mounting ratio of the electronic components Wt on the plate-shaped member Wb or the total volume of the electronic components Wt. The sheet-shaped resin R after cutting is supplied to the workpiece W by a resin pickup (not illustrated).

The loader 37 transports the workpiece W on which the sheet-shaped resin R is mounted to the press unit J and loads the workpiece W on the lower mold facing an upper-mold cavity of the sealing mold 2. The workpiece W obtained after the compression molding is taken out from the opened sealing mold 2 by an unloader 38 and is carried out to the molded-product storing unit K. A molded-product taking-out table 39 is arranged in the molded-product storing unit K, and the unloader 38 takes out the workpiece W. The workpiece W obtained after the compression molding does not have unnecessary resin, and a molded product pickup (not illustrated) stores the molded product into the storage magazine 40 from the molded-product taking-out table 39. The loader 37 and the unloader 38 are arranged to reciprocate by sharing a rail 41 erected over the workpiece supply unit H, the resin supply unit I, the press unit J, and the molded-product storing unit K.

Also in the configuration, the appropriate amount of sheet-shaped resin R can be supplied without redundancy or deficiency for one-time compression molding together with the workpiece to the upper-mold cavity movable compression-molding mold.

In addition, the weight of the resin is measured after the cutting of the appropriate amount of sheet-shaped resin R in the example; however, the measurement is not necessarily performed, and a camera-based imaging stage may be arranged instead of the measurement stage 26, since the sheet-shaped resin R has the predetermined thickness. In this case, the volume of the corresponding sheet-shaped resin R is obtained from an area of the sheet-shaped resin R imaged by the camera.

What is claimed is:

1. A resin-sealing method for carrying a sheet-shaped resin to be compression molded and a workpiece having an electronic component mounted on a plate-shaped member into a sealing mold, and performing compression molding, the resin-sealing method comprising:

a step of acquiring workpiece information on a mounting ratio of the electronic component mounted on the plate-shaped member or a total volume of the electronic component for each workpiece which is supplied from a workpiece supply part;

a step of calculating an amount of resin required for each workpiece from the workpiece information;

a resin supplying step of supplying the sheet-shaped resin to be compression molded by cutting out an appropriate amount of sheet-shaped resin to be compression molded into a predetermined shape corresponding to a shape of the workpiece without redundancy or deficiency for one-time compression molding over an entire periphery from a long resin sheet formed to have a predetermined thickness, the long resin sheet being unwound by a resin supply part;

a step of measuring an amount of the sheet-shaped resin to be compression molded cut out by the resin supply part by a measurement stage arranged on an upstream side of the sealing mold before the sheet-shaped resin to be compression molded is carried into the sealing mold, wherein after a measurement, the whole sheet-shaped resin to be compression molded is completely discarded in a case that the sheet-shaped resin to be compression molded is measured to be out of a range of the appropriate amount and another sheet-shaped resin to be compression molded is supplied by the resin supply part before the sheet-shaped resin to be compression molded is carried into the sealing mold;

a step of providing and holding a film on a resin feeding hole formed in a transport tool;

a step of dropping the sheet-shaped resin to be compression molded on the film held by the resin feeding hole;

a step of carrying the transport tool that holds the film and the sheet-shaped resin to be compression molded into the sealing mold; and a step of carrying the workpiece into the sealing mold and clamping and compression-molding the workpiece, the film and the sheet-shaped resin to be compression molded.

2. The resin-sealing method according to claim 1, wherein, when the amount of resin is deficient according to the mounting ratio of the electronic component mounted on the plate-shaped member, an appropriate amount of sheet-shaped resin to be compression molded obtained by adding the deficient amount of resin is cut out.

3. The resin-sealing method according to claim 2, further comprising:

a computing step of computing the appropriate amount of sheet-shaped resin to be compression molded.

4. The resin-sealing method according to claim 1, wherein a required resin volume is calculated by subtracting the total volume of the electronic component mounted on the plate-shaped member from a volume of an empty cavity of the sealing mold such that the appropriate amount of sheet-shaped resin to be compression molded is cut out.

5. The resin-sealing method according to claim 4, further comprising:

a computing step of computing the appropriate amount of sheet-shaped resin to be compression molded.

6. The resin-sealing method according to claim 1, further comprising:

a computing step of computing the appropriate amount of sheet-shaped resin to be compression molded.

7. A resin-sealing method for carrying a sheet-shaped resin to be compression molded and a workpiece having an electronic component mounted on a plate-shaped member into a sealing mold, and performing compression molding, the resin-sealing method comprising:

a step of acquiring workpiece information on a mounting ratio of the electronic component mounted on the plate-shaped member or a total volume of the electronic component for each workpiece which is supplied from a workpiece supply part;

a step of calculating an amount of resin required for each workpiece from the workpiece information;

a resin supplying step of supplying the sheet-shaped resin to be compression molded by cutting out an appropriate amount of sheet-shaped resin to be compression molded by a predetermined length without redundancy or deficiency for one-time compression molding for each workpiece from a long resin sheet formed to have a predetermined width and a predetermined thickness, the long resin sheet being unwound by a resin supply part;

a step of measuring an amount of the sheet-shaped resin to be compression molded cut out by the resin supply part by a measurement stage arranged on an upstream side of the sealing mold before the sheet-shaped resin to be compression molded is carried into the sealing mold, wherein after a measurement, the whole sheet-shaped resin to be compression molded is completely discarded in a case that the sheet-shaped resin to be compression molded is measured to be out of a range of the appropriate amount and another sheet-shaped resin to be compression molded is supplied by the resin supply part before the sheet-shaped resin to be compression molded is carried into the sealing mold;

a step of providing and holding a film on a resin feeding hole formed in a transport tool;

a step of dropping the sheet-shaped resin to be compression molded on the film held by the resin feeding hole;

a step of carrying the transport tool that holds the film and the sheet-shaped resin to be compression molded into the sealing mold; and a step of carrying the workpiece into the sealing mold and clamping and compression-molding the workpiece, the film and the sheet-shaped resin to be compression molded.

8. The resin-sealing method according to claim 7, wherein, when the amount of resin is deficient according to the mounting ratio of the electronic component mounted on the plate-shaped member, an appropriate amount of sheet-shaped resin to be compression molded obtained by adding the deficient amount of resin is cut out.

9. The resin-sealing method according to claim 8, further comprising:

a computing step of computing the appropriate amount of sheet-shaped resin to be compression molded.

10. The resin-sealing method according to claim 7, wherein a required resin volume is calculated by subtracting the total volume of the electronic component mounted on the plate-shaped member from a volume of an empty cavity of the sealing mold such that the appropriate amount of sheet-shaped resin to be compression molded is cut out.

11. The resin-sealing method according to claim 10, further comprising:

a computing step of computing the appropriate amount of sheet-shaped resin to be compression molded.

12. The resin-sealing method according to claim 7, further comprising:

a computing step of computing the appropriate amount of sheet-shaped resin to be compression molded.

\* \* \* \* \*